US006370974B1

United States Patent
Jourtchenko et al.

(10) Patent No.: US 6,370,974 B1
(45) Date of Patent: Apr. 16, 2002

(54) DISPLACEMENT DEVICE, IN PARTICULAR FOR PROJECTORS

(76) Inventors: Juri F. Jourtchenko, Uliza Karbischeva, 23-1-10, 143400 Krasnogorsk; Vladimir K. Belyakov, Prospekt Lenina, 53-57, 143900 Balaschicha, both of (RU)

( * ) Notice: Subject to any disclaimer, the term of this patent is extended or adjusted under 35 U.S.C. 154(b) by 0 days.

(21) Appl. No.: 09/559,513

(22) Filed: Apr. 27, 2000

(30) Foreign Application Priority Data

Apr. 28, 1999 (DE) .................................. 299 07 531 U

(51) Int. Cl.$^7$ ............................................. F16H 19/02
(52) U.S. Cl. ................................ 74/89.22; 74/89.2
(58) Field of Search .......................... 74/89.2, 89.22, 74/10.7, 506

(56) References Cited

U.S. PATENT DOCUMENTS 3,572,141 A * 3/1971 Wilkes ....................... 74/89.22
3,828,615 A * 8/1974 O'Connor .................. 74/89.22

FOREIGN PATENT DOCUMENTS

CA            668141      *  8/1963    ................. 74/89.2

OTHER PUBLICATIONS

Author's Certificate, No. 1430990, issued Oct. 29, 1984.
Author's Certificate, No. 1439686, issued JUl. 30, 1986.

* cited by examiner

Primary Examiner—Richard M. Lorence
(74) Attorney, Agent, or Firm—Henry M. Feiereisen

(57) ABSTRACT

A displacement device for realizing high-precision displacement, in particular for reduction projectors, includes a housing, a movable element which can move relative to the housing, and a moveable drum. The drum is enveloped by flexible elements, with first ends of the flexible elements fixedly attached to the housing and the respective other ends of the flexible elements attached to the movable element on the diametrically opposite side of the drum, whereby the flexible elements are pretensioned.

8 Claims, 4 Drawing Sheets

DISPLACEMENT DEVICE, IN PARTICULAR FOR PROJECTORS

CROSS-REFERENCES TO RELATED APPLICATIONS

This application claims the priority of German Patent Application, Serial No. 299 07 531.1, filed Apr. 28, 1999, the subject matter of which is incorporated herein by reference.

BACKGROUND OF THE INVENTION

The present invention relates, in general, to a device providing positioning, registration and displacement, in particular for projection devices, and is useful in device manufacturing, such as projection mask aligners, and for measurement that requires high-precision alignment, such as scanning electron microscopy.

A precision positioning device requires a stable actuating and operating mechanisms, in particular for the output stage of the drives, to achieve the required accuracy. These requirements can be satisfied by displacement devices which have flexible elements but do not have kinematic mechanisms in the last stage, making it possible to tension the elements that transfer the motion to the maximum limit.

A device employing cylinders or rollers to provide a displacement is known from Author's Certificate, No. 1430990, issued Oct. 29, 1984. The device includes three flexible connections, with one connection stacked on top of the next, wherein the ends of the upper flexible connection area are secured to the movable element and the ends of the lower flexible connection are secured to the housing. This device incorporates rollers and suffers shortcomings as a consequence of a third flexible connection which results in a relative complex configuration. Moreover, the device has a limited range because the flexible connections are fixedly attached to the roller.

Another displacement device is disclosed in Author's Certificate, No. 1439686, issued Jul. 30, 1986. This device includes a moveable housing, a movable element and two flexible elements of different thickness, wherein the ends of the elements are fixedly attached to respective elements on the circumference of the drum and the support rollers with a loop. This device is also relatively complex due to the additional support rollers. In addition, the friction forces are higher as a consequence of internal expansion forces between the drum, the rollers and the housing, which when taken together decrease the positional accuracy of the movable element.

SUMMARY OF THE INVENTION

It is thus an object of the present invention to provide an improved displacement device, obviating the afore-stated drawbacks.

In particular, it is an object of the present invention to provide an improved displacement device which is simple in design and increases the positional accuracy during displacement.

SUMMARY OF THE INVENTION

These objects, and others which will become apparent hereinafter, are attained in accordance with the present invention by providing a housing, an element which is movable relative to the housing, and a moveable drum which is enveloped by flexible elements, with first ends of the flexible elements fixedly attached to the housing and the other ends of the flexible elements pretensioned and attached to the movable element on the diametrically opposed side of the drum.

Suitably, the drum has a stepped configuration, wherein the steps of the drum may advantageously aligned in an axial direction of the drum. The flexible elements may be placed on the different axial steps abound the drum, and/or the first ends of the flexible elements may be attached to the movable element by means of a traverse bar.

According to another feature of the present invention, the movable element may be designed as a single coordinate table movable in one direction relative to the housing. The flexible elements can further be implemented in the form of bands, made preferably of a metal.

BRIEF DESCRIPTION OF THE DRAWING

The above and other objects, features and advantages of the present invention will be more readily apparent upon reading the following description of a preferred exemplified embodiment of the invention with reference to the accompanying drawing, in which:

FIG. 1b is a side view of the displacement device as viewed in the direction A in FIG. 1a;

FIG. 2 is a perspective view of the displacement device of FIG. 1a;

FIGS. 3c and 3d illustrate overall design criteria of the displacement device of FIG. 3a.

DETAILED DESCRIPTION OF PREFERRED EMBODIMENTS

Figure 1A:
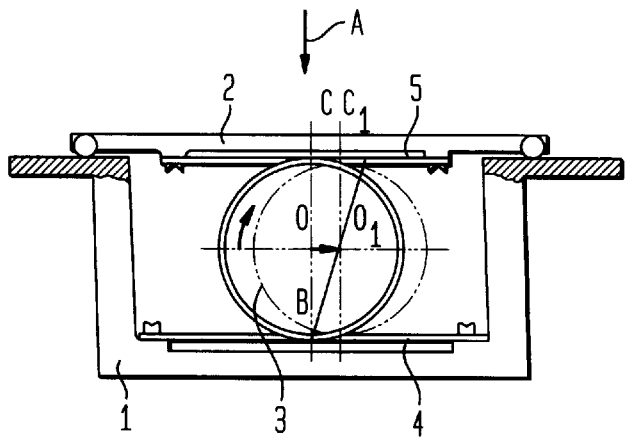
FIG. 1a is a partially sectional overall view of a first embodiment of a displacement device according to the present invention.

Throughout all the Figures, same or corresponding elements are generally indicated by same reference numerals.

Turning now to the drawing, and in particular to FIG. 1, there is shown a partially sectional overall view of a first embodiment of a displacement device according to the present invention, including a housing 1, a drum 3 adapted for displacement and accommodated in the housing 1, and flexible elements 4, 5 which envelope the entire circumference of the drum 3, as viewed in cross-section. The ends of the flexible elements 4, 5 are pretensioned, with first ends of the flexible elements 4, 5 fixedly attached to the housing 1 and the other ends of the flexible elements 4, 5 attached to a movable element 2 on the diametrically opposing side of the drum 3.

Figure 1B:
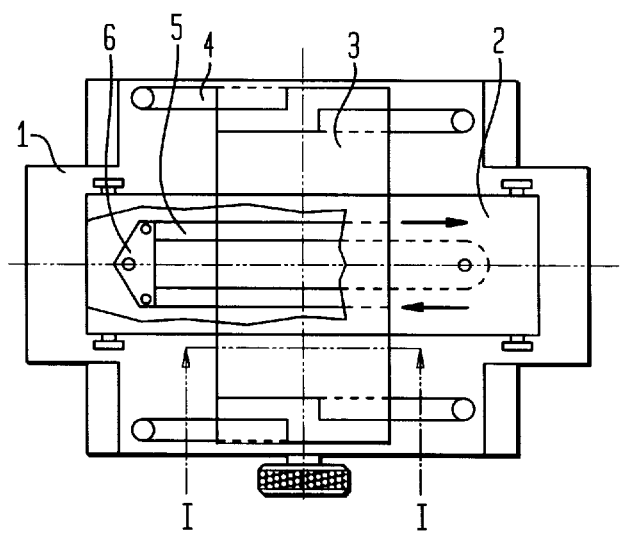
Figure 1C:
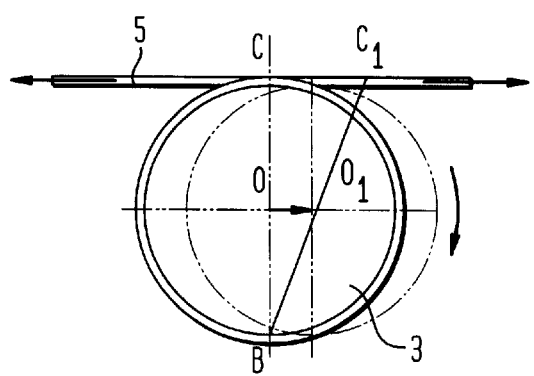
FIG. 1c is a sectional view of the displacement device FIG. 1b, taken along the line I—I.

FIG. 1a shows an overall view of the device, FIG. 1b is a side view of FIG. 1a as viewed in the direction A and FIG. 1c is a cross-sectional view of FIG. 1b taken along the line I—I.

The housing 1 of the displacement device is stationary, and the drum 3 is enveloped at one side of the drum diameter by the flexible elements 4 and at the diametrically opposite side by the flexible elements 5. First ends of the flexible elements 5 are fixedly attached to the movable element 2 by means of a traverse bar 6. The flexible elements 4 are fixedly secured to the housing 1. The movable element 2, for example a single-coordinate table, is constructed to be movable in one direction relative to the housing 1, for example on rollers or sliders.

To prevent the drum 3 from slipping, the flexible elements 4, 5 envelope the drum 3 about its entire circumference and are pretensioned at a predetermined force. The displacement device operates as follows: When rotating, the drum 3 rolls on the flexible elements 4 relative to the housing 1. Point B is the center of the instantaneous velocity of the drum 3. The flexible element 5 which envelopes the drum 3 from the diametrically opposite side, rolls relative to the drum 3 without slippage and displaces the movable element 2 which is connected to the flexible element 5. Point C shifts thereby to point C1, and point O (the center of the drum 3) shifts to point O1. The displacement of the movable element 2 is twice the displacement of the center of the drum 3 (distance O–O1), since the distance BC is twice the distance BO. The device has the advantage that with even when the drum 3 has a minimum diameter, with the diameter limited only by the permissible tension in the flexible elements 4, 5, the movable element 2 can be displaced by twice the displacement of the center of a drum 3. The displacement device can transmit both the movement from the drum 3 to the movable element 2, as well as the movement from the movable element 2 to the drum 3 (in the opposite direction). Since the flexible elements 4, 5 envelope the circumference of the drum 3, with the ends of the flexible elements 4, 5 drawn in a straight line, no additional forces, in particular no additional friction forces, are introduced between the drum 3 and the housing 1, thereby increasing the positional accuracy of the movable element 2.

In the event, the flexible elements 4, 5 are not fixedly attached to the drum 3 or are implemented as cables (threads), it is sufficient to envelope the drum 3 only once with a flexible element. If, on the other hand, the flexible elements 4, 5 are implemented as bands or are fixedly attached to the drum 3, the displacement of the movable element 2 can be improved by winding the flexible band around the drum 3 twice or several times. However, in this case, the displacement of the movable element 2 becomes a nonlinear function.

The kinematic diagram of the exemplary linear rolling-type displacement device will now be described with reference to FIG. 2.

Figure 2:
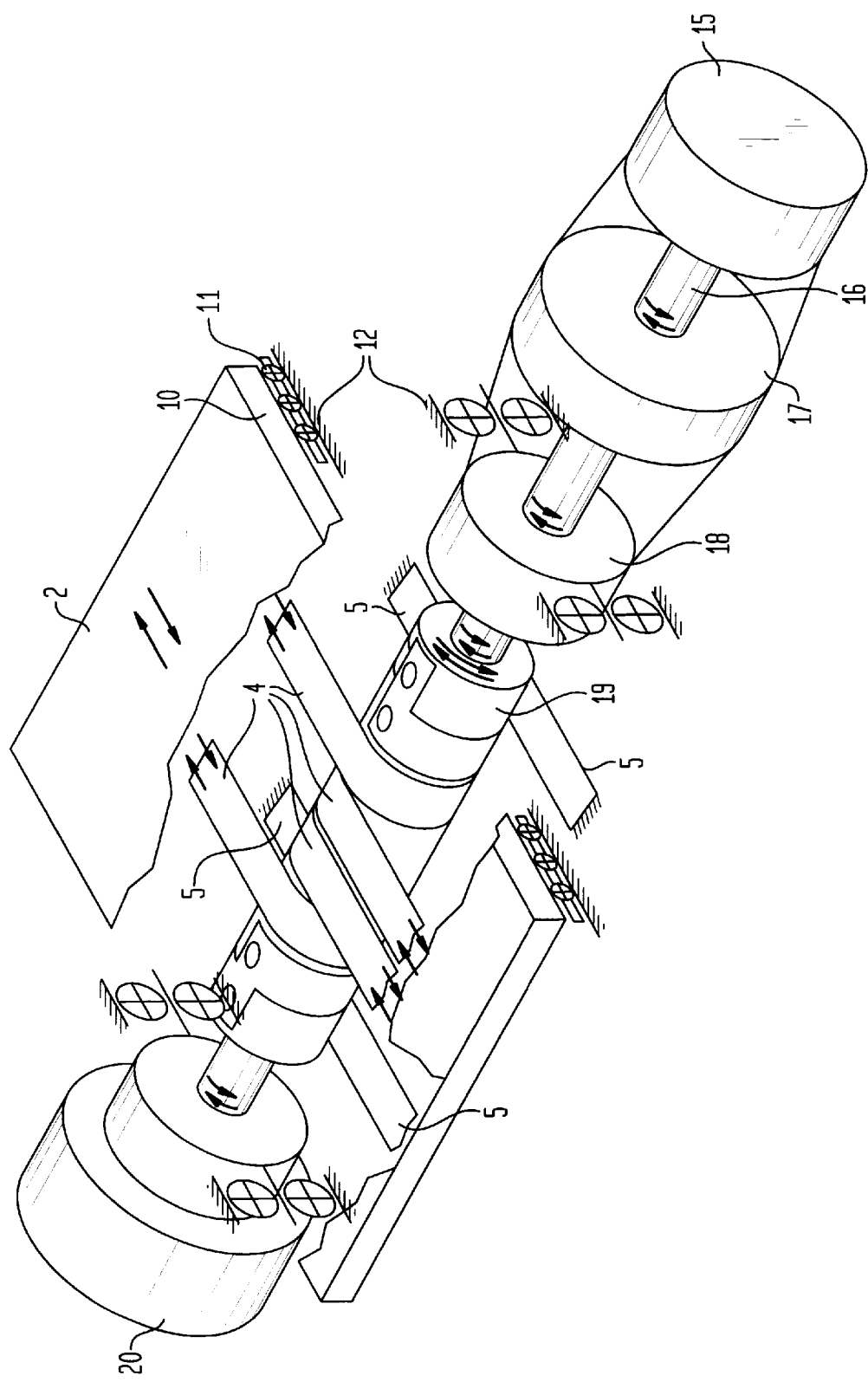

FIG. 2 is a perspective view of the displacement device of FIG. 1a, further including in rigid interconnection (without play) an electric motor 15 with a shaft 16, a position sensor 17, a friction shaft reduction gear 18 with input and output shafts, a shaft 19 and a shaft of a position transmitter 20, thereby forming a unitary rotation assembly for the movable element 2 of the displacement device. Flexible metal bands 4 are pretensioned, with one end thereof fixedly attached to the shaft 19 and the other end thereof fixedly attached to the movable element 2 of the displacement device. When the electric motor 15 rotates, the shaft 19 rolls without slippage on the bands 5 and takes up or unwinds the bands 4, thereby drawing the movable element 2. The movable element 2 moves along slideways, which are implemented as multi-track slideways having an array of balls 11 separated by spacers 10. With a suitable choice of design parameters, the stiffness of each track (groove), the flexible characteristics of the base area and the support surface 12 of the tracks, the number of balls and the like, provide a motion linearity with an accuracy of ±0.05 microns. A particular feature of the kinematics of the device drive is the presence of two displacement (position) sensors 17, 20 disposed on the input and output shaft 19 of the reduction gear 18. The sensor 17 is used to control the electric motor 15, whereas the sensor 20 is used to indicate the rotation angle directly on the working element of the device. In this context, it will be assumed that the non-deformable flexible elements 4, 5 of the band reduction gear 18 transmit the movement of the output shaft 19 to the movable element 2, which forms the final working element, without introducing deviations in the transmission of the motion.

Figure 3A:
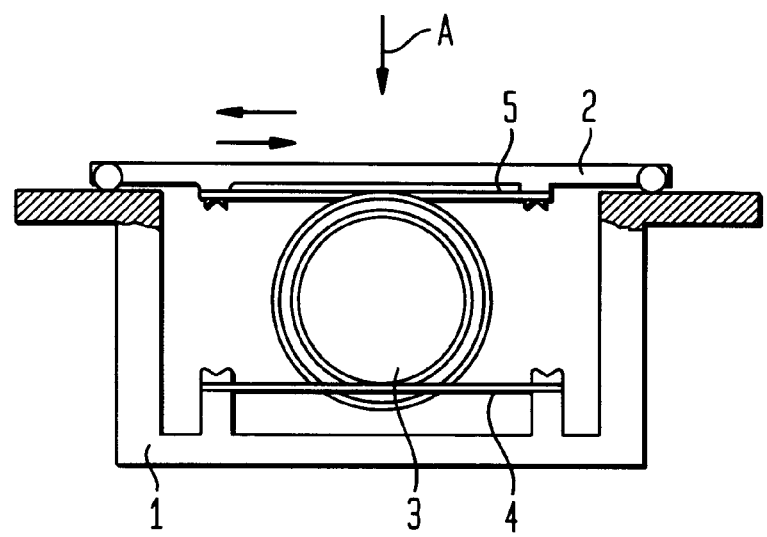
FIG. 3a is a partially sectional overall view of a second embodiment of a displacement device according to the present invention.
Figure 3B:
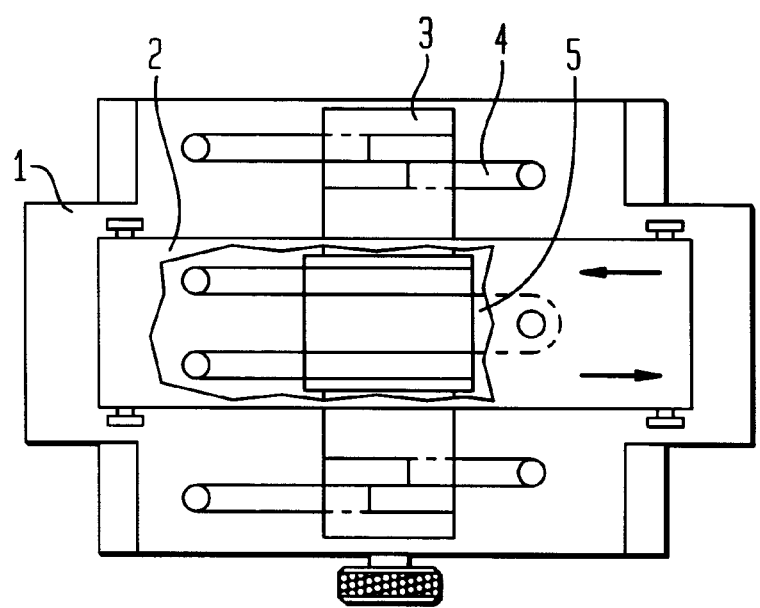
FIG. 3b is a side view of the displacement device, as viewed in the direction A.
Figure 3C:
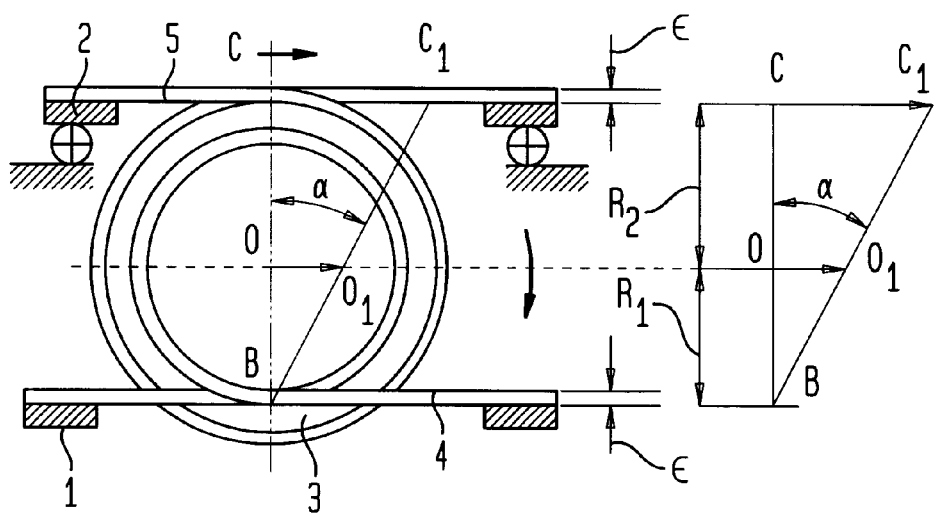
Figure 3D:
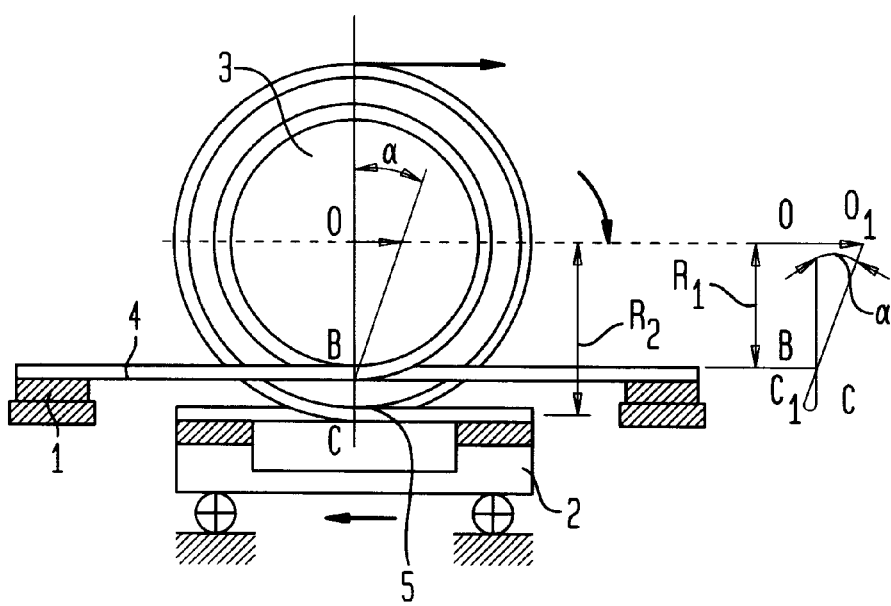

Turning now to FIGS. 3a to 3d, there are shown a second embodiment of a displacement device according to the present invention, with FIG. 3a showing an overall view, FIG. 3b depicting a side view, and FIGS. 3c, 3d illustrating overall design criteria of the displacement device. Parts corresponding with those in FIG. 1a are denoted by identical reference numerals and not explained again. The flexible elements 4, 5 of the drum 3 envelope the entire cross-section of the circumference (the drum is movable and has steps of different diameter in the axial direction); one of the ends of the flexible elements 4, 5 are tensioned and are fixedly attached to the housing 1, whereas the diametrically opposite ends enveloping the drum 3 are attached to the movable element 2.

The displacement device thus includes the flexible elements 4, 5, the stationary housing 1, the movable element 2, the stepped drum 3, with one of the diameters enveloped by the flexible elements 5. The one ends of the flexible elements 4, 5 are tensioned and fixedly secured to the housing 1, whereas the other ends are connected to the movable element 2. The displacement device according to the second embodiment operates as follows: When rotating, the drum 3 rolls on the flexible elements 4 which are secured to the housing 1. The other flexible elements 5 which envelope the drum 3 on another diameter, wind around the drum 3 without slippage and displace the movable element 2 which is attached to the other flexible elements 5.

Point B represents the instantaneous velocity of the drum 3. When the drum 3 is wound up, the center of the drum 3 shifts from point 0 to point 01, and point C shifts to point C1. The magnitude of the displacement of the movable element 2 (distance C–C1), expressed in mm, is calculated according to the following relation:

$$\Delta L = \frac{\pi * \alpha}{180}\left[\left(R_1 + \frac{\alpha_1}{2}\right) \pm \left(R_2 + \frac{\alpha_2}{2}\right)\right]$$

wherein $\alpha$ is the rotation angle of the drum 3 in degrees;

$R_1$, $R_2$ are the radii of the drum steps in mm;

$a_1$, $a_2$ are thickness of the respective elements in mm.

If the alignment points of the flexible elements are located on opposite sides of the drum axis, the "+" sign is used in the above equation; if the alignment points are located on the same side of the drum axis, the "–" sign is used.

By attaching flexible elements to the same or opposite sides of the drum axis, different displacements of the movable element 2 having different magnitudes can be realized.

In the following example, the radius of the drum steps is $R_1 = 25.1$ mm, $R_2 = 25.0$ mm, with the band thickness $a_1 = a_2 = 0.1$ mm. The displacement of the movable element 2 for the same rotation angle, taken as 1°, is equal to:

$$\Delta L = \frac{3.14 * 1}{180}\left[\left(25.1 + \frac{0.1}{2}\right) + \left(25 + \frac{0.1}{2}\right)\right] = 8.7 * 10^{-1} \text{ mm}$$

Conversely, if the flexible connections are attached to the same side, the displacement is:

$$\Delta L = \frac{3.14*1}{180}\left[\left(25.1+\frac{0.1}{2}\right)-\left(25+\frac{0.1}{2}\right)\right] = 1.7*10^{-3} \text{ mm}$$

i.e., approximately 500 times smaller.

While the invention has been illustrated and described as embodied in a displacement device, in particular for projectors, it is not intended to be limited to the details shown since various modifications and structural changes may be made without departing in any way from the spirit of the present invention.

What is claimed as new and desired to be protected by Letters Patent is set forth in the appended claims:

1. A displacement device, in particular for projectors, comprising:
    a housing;
    a movable element movable relative to the housing;
    a drum movable relative to the housing; and
    a plurality of flexible elements having first and second ends and enveloping the drum,
    wherein the first ends of the flexible elements are fixedly attached to the housing and the second ends of the flexible elements are attached to the movable element on the diametrically opposite side of the drum, and wherein the seconds ends of the flexible elements are pretensioned.

2. The displacement device of claim 1, wherein the drum has a stepped configuration.

3. The displacement device of claim 2, wherein the gradations of the drum are disposed in an axial direction of the drum.

4. The displacement device of claim 3, wherein the flexible elements are placed around the drum at different gradations.

5. The displacement device of claim 1, and further comprising a traverse bar for securing the second ends of the flexible elements to the movable element.

6. The displacement device of claim 1, wherein the moveable element is implemented as a single-coordinate table which is movable in one direction relative to the housing.

7. The displacement device of claim 1, wherein the flexible elements are constructed as flexible bands.

8. The displacement device of claim 7, wherein the flexible band is made of metal.

* * * * *